United States Patent [19]

Short, III

[11] Patent Number: 4,549,565
[45] Date of Patent: Oct. 29, 1985

[54] RECLOSING RUPTURE DISK ASSEMBLY

[75] Inventor: Edward H. Short, III, Tulsa, Okla.

[73] Assignee: BS&B Safety Systems, Inc., Tulsa, Okla.

[21] Appl. No.: 586,279

[22] Filed: Mar. 5, 1984

[51] Int. Cl.[4] .............................................. F16K 13/04
[52] U.S. Cl. ..................................... 137/71; 137/68.1; 137/516.15; 137/860; 220/89 A; 220/209
[58] Field of Search .......... 137/71, 68 R, 860, 516.15; 220/89 A, 208, 209, 207

[56] References Cited

U.S. PATENT DOCUMENTS

| | | | |
|---|---|---|---|
| 3,201,284 | 8/1965 | Ellis | 137/860 X |
| 3,298,394 | 1/1967 | Chorkey | 137/516.19 X |
| 3,872,875 | 3/1975 | Raidl | 137/71 |
| 3,906,977 | 9/1975 | Summers | 137/71 |
| 4,126,184 | 11/1978 | Hinrichs | 137/68 X |

FOREIGN PATENT DOCUMENTS

| | | | |
|---|---|---|---|
| 541231 | 5/1957 | Canada | 137/516.15 |
| 1000197 | 1/1957 | Fed. Rep. of Germany | 137/68 R |
| 6611202 | 2/1968 | Netherlands | 137/860 |
| 2028426 | 3/1980 | United Kingdom | 137/71 |

Primary Examiner—Harold W. Weakley
Attorney, Agent, or Firm—C. Clark Dougherty, Jr.

[57] ABSTRACT

A rupture disk assembly is provided which after rupture and pressurized fluid relief, recloses itself to prevent backflow therethrough. The assembly is comprised of a hollow rupture disk support member having a pressurized fluid inlet opening at one end and at least one pressurized fluid discharge port at the other end. A rupture disk is sealingly attached to the support member whereby until the rupture thereof, pressurized fluid is prevented from flowing through the support member to the discharge port therein. A closure member is sealingly positioned over the outlet of the discharge port and is biased towards the outlet of the discharge port so that upon rupture of the rupture disk and the release of pressurized fluid through the support member to the discharge port, the force of the pressurized fluid exerted on the closure member overcomes the bias of and moves the closure member away from the discharge port whereby the pressurized fluid flows therethrough, but upon termination of the flow of pressurized fluid through the discharge port the closure member moves back into a sealing position over the discharge port.

4 Claims, 7 Drawing Figures

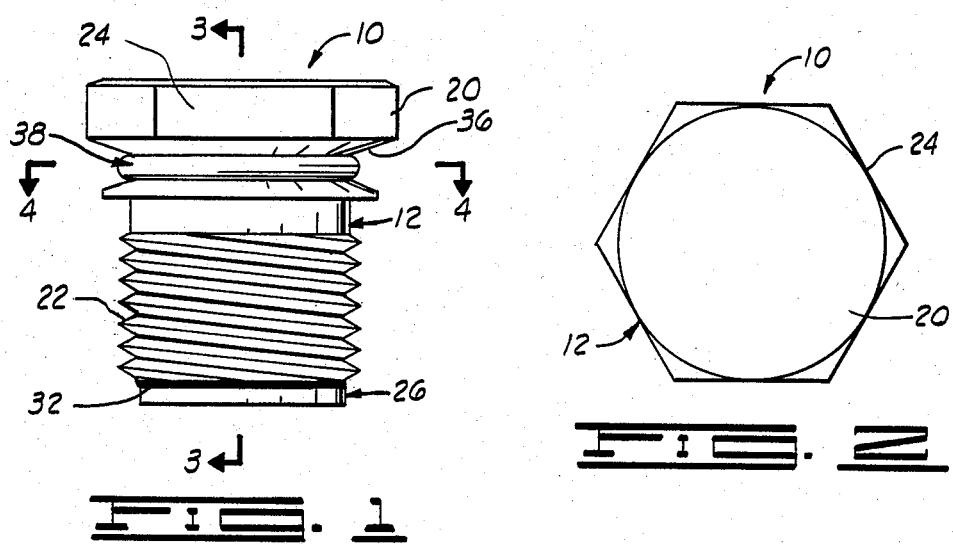
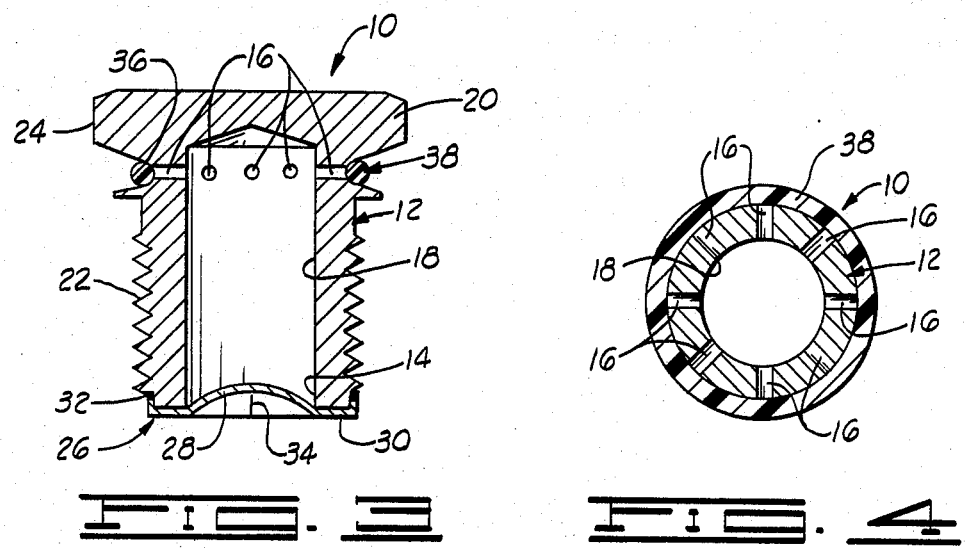
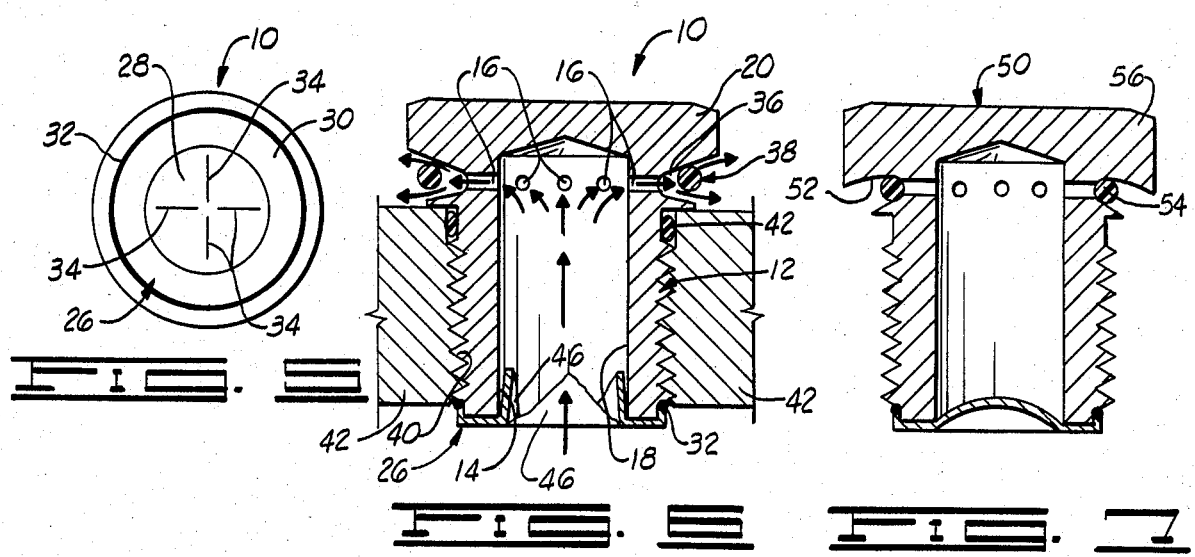

RECLOSING RUPTURE DISK ASSEMBLY

BACKGROUND OF THE INVENTION

1. Field of the Invention

This invention relates to a reclosing rupture disk assembly, and more particularly, but not by way of limitation, to a rupture disk assembly which recloses itself to prevent backflow after rupture and pressurized fluid relief therethrough.

2. Description of the Prior Art

A great variety of rupture disk assemblies have been developed and used heretofore. Such assemblies typically include a rupture disk supported by one or more rupture disk support members adapted to be connected or clamped in a flow passageway. The flow passageway typically communicates a first zone containing fluids under pressure with a second zone containing fluids at a lower pressure than the first zone. For example, the first zone can be a vessel or system containing fluids under pressure and the second zone at a lower pressure can be the atmosphere or another vessel or system.

In the operation of such a rupture disk assembly, if an overpressure condition is reached in the first zone, the rupture disk whereby pressurized fluids from the first zone flow through the rupture disk assembly to the second zone. Once the pressure in the first zone has been relieved to the second zone, the rupture disk assembly remains open whereby backflow from the second zone to the first zone can take place until a new rupture disk is installed in the assembly.

In some applications it is desirable that once an overpressure condition in the first zone has been prevented by pressurized fluid relief through the rupture disk assembly to the second zone, backflow from the second zone to the first zone be prevented. This has heretofore been accomplished in some applications utilizing spring-operated relief valves downstream of rupture disk assemblies. However, such arrangements are expensive and are generally only used in applications where relatively high flow rates of pressurized fluids are relieved. By the present invention a simple unitary reclosing rupture disk assembly is provided which is inexpensive and reliable and which is particularly suitable for use in applications where low fluid flow rates are involved.

SUMMARY OF THE INVENTION

A rupture disk assembly is provided which recloses itself and prevents backflow after rupture of the rupture disk and pressurized fluid relief therethrough. The assembly is comprised of a hollow rupture disk support member having a pressurized fluid inlet opening at one end and at least one pressurized fluid discharge port at the other end. A rupture disk is sealingly attached to the support member whereby pressurized fluid is prevented from flowing through the support member to the discharge port until the rupture disk ruptures. A closure member is sealingly positioned over and biased towards the outlet of the pressurized fluid discharge port so that upon rupture of the rupture disk and the release of pressurized fluid through the support member to the discharge port, the force of the pressurized fluid exerted on the closure member overcomes the bias of the closure member and the pressurized fluid flows therethrough. Upon termination of the flow of pressurized fluid through the discharge port, the closure member moves back into a sealing position over the discharge port.

It is, therefore, a general object of the present invention to provide a reclosing rupture disk assembly.

A further object of the present invention is the provision of a rupture disk assembly having the ability to reclose itself after pressure relief therethrough which is simple and economical.

Yet a further object of the present invention is the provision of a unitary reclosing rupture disk assembly for use in low flow rate pressure relief applications.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side elevational view of the rupture disk assembly of the present invention.

FIG. 2 is a top plan view of the assembly of FIG. 1.

FIG. 3 is a cross-sectional view taken along line 3—3 of FIG. 1.

FIG. 4 is a sectional view taken along line 4—4 of FIG. 1.

FIG. 5 is a bottom view of the assembly of FIG. 1.

FIG. 6 is a cross-sectional view of the assembly of FIG. 1 illustrating its operation.

FIG. 7 is a cross-sectional view of an alternate form of the assembly of the present invention.

DESCRIPTION OF PREFERRED EMBODIMENTS

Referring now to the drawings and particularly to FIGS. 1 through 5, a reclosing rupture disk assembly of the present invention is illustrated and generally designated by the numeral 10. The assembly 10 includes a hollow rupture disk support member 12 which can take various forms and which is adapted to be connected or clamped in a pressure relief passageway. In the presently preferred form illustrated in the drawings, the support member 12 includes a pressurized fluid inlet opening 14 at one end communicated with a plurality of pressurized fluid discharge ports 16 at the other end. More specifically, the support member 12 includes an internal flow passageway 18 which forms the pressurized fluid inlet 14 and which is closed at the other end by an enlarged solid portion 20. The discharge ports 16 extend radially from the passageway 18 through the sides of the support member 12 adjacent the closed end thereof and are positioned in spaced relationship to each other.

In the form of the rupture disk assembly 10 illustrated in the drawings, conventional threads 22 are disposed around the outside periphery of a portion of the support member 12 including the end thereof having the pressurized fluid inlet opening 14 therein. The enlarged portion 20 which closes the passageway 18 at the end opposite the inlet 14 includes a plurality of flat parallel surfaces 24 formed around the outside periphery thereof. As will be understood, in use the support member 12 is threadedly connected in a complementary threaded pressure relief passageway by means of the threads 22, and the flat parallel surfaces 24 on the enlarged portion 20 facilitate using a wrench for effecting the connection.

Attached over the pressurized fluid inlet opening 14 of the support member 12 is a rupture disk 26. As best shown in FIGS. 1, 3 and 5, the rupture disk 26 includes a central concave-convex portion 28 connected to an annular flange portion 30. The outer edge of the flange portion 30 is folded over the peripheral end surface of the support member 12 and welded thereto by means of a continuous weld 32. Thus, the rupture disk 26 seals the pressurized fluid inlet opening 14 of the support member 12 whereby pressurized fluid is prevented from flowing through the passageway 18 of the support member 12 to the discharge ports 16 thereof until the rupture disk 26 ruptures.

As is well understood by those skilled in the art, the rupture disk 26 can take various forms other than the form illustrated. For example, instead of including the concave-convex portion 28 which extends into the passageway 18 of the support member 12, the rupture disk 26 can be flat or it can be a reverse buckling rupture disk, i.e., it can include an oppositely extending concave-convex portion which reverses itself prior to rupture. In the preferred form, the concave-convex portion 28 of the disk 26 extends into the passageway 18 of the support member 12 whereby it is less likely to be damaged. In addition, the concave-convex portion 28 preferably includes one or more scores 34 on a surface thereof which form lines of weakness in the rupture disk and facilitate its tearing without fragmentation upon rupture.

As illustrated in FIGS. 3 and 4, the pressurized fluid discharge ports 16 all lie in a plane transverse to the longitudinal axis of the support member 12. The support member 12 further includes a continuous groove 36 in the external sides thereof. The groove 36 lies in the same plane as the discharge ports 16 whereby the outlets of the discharge ports 16 all intersect the groove 36.

Disposed within the groove 36 is a closure member 38 which is biased towards the outlets of the discharge ports 16. While the closure member 38 can take various forms and have various cross-sectional shapes such as rectangular, triangular, circular, etc., it is preferably a continuous ring of resilient material having a circular cross-sectional shape. A preferred particularly suitable closure member is a conventional resilient O-ring.

The closure member 38 is of a size such that when disposed within the groove 36 it is biased by its resiliency towards the side of the support member 12 and towards the outlets of the discharge ports 16 whereby the outlets are sealed or closed by the closure member 38 as shown in FIGS. 3 and 4.

OPERATION OF THE ASSEMBLY 10

Referring now to FIG. 6, the assembly 10 is illustrated threadedly connected into a complementary threaded opening 40 in a wall 42. A conventional O-ring 44 is disposed between the opening 40 and support member 12 so that a seal is insured therebetween. The wall 42 separates first and second zones containing pressurized fluids. That is, the first zone containing fluids under pressure is on the side of the wall 42 adjacent the rupture disk 26 of the assembly 10, and the second zone is on the opposite side which is adjacent the enlarged portion 20 and discharge ports 16 of the assembly 10. The pressurized fluids in the second zone are at a lower pressure level than the pressurized fluids in the first zone so that pressure relief can be effected in the first zone by the flow of fluids from the first zone to the second zone.

As illustrated in FIG. 6, when the pressure level of the fluids in the first zone exceeds the pressure at which the rupture disk 26 is designed to rupture, the disk 26 ruptures along the lines of weakness formed by the scores 34 whereby four triangular petals 46 are formed which fold into the passageway 18 by the force of pressurized fluids flowing therethrough. That is, upon rupture of the disk 26, pressurized fluids flow from the first zone by way of the inlet 14 and passageway 18 in the support member 12 to the discharge ports 16. The pressurized fluids are communicated by way of the discharge ports 16 to the resilient closure member 38, and the consequent force created by the differential pressure exerted across the closure member 38 causes it to move outwardly as illustrated in FIG. 6 whereby pressurized fluids flow through the discharge ports 16 into the second zone. The flow of pressurized fluids through the assembly 10 relieves pressure from the first zone into the second zone and when the pressure is relieved and the flow of fluids from the first zone to the second zone through the assembly 10 is terminated, the closure member 38 moves back into its original position within the groove 36 whereby the outlets of the discharge ports 16 are sealed thereby. The sides of the groove 36 contain and guide the closure member 38 so that it properly repositions itself after discharge. The sealing of the outlets of the discharge ports by the closure member prevents backflow from the second zone to the first zone.

Referring now to FIG. 7, an alternate form of the apparatus of the present invention is illustrated and generally designated by the numeral 50. The apparatus 50 is identical to the apparatus 10 described above except that the groove 52 for containing the closure member 54 is formed whereby it provides a shroud over the closure member 54. The shrouding of the closure member 54 provides some protection against clogging, etc. The operation of the assembly 50 is identical to the operation of the assembly 10 described above.

Thus, the present invention is well adapted to carry out the objects and attain the ends and advantages mentioned as well as those inherent therein. While numerous changes can be made in the construction and arrangement of parts, such changes are encompassed within the spirit of this invention as defined by the appended claims.

What is claimed is:

1. A rupture disk assembly which recloses itself to prevent backflow after rupture and pressurized fluid relief therethrough, comprising:

a hollow substantially cylindrical rupture disk support member having a pressurized fluid inlet opening at one end, a closed opposite end and at least one pressurized fluid discharge port extending through a side thereof adjacent said closed end, said support member including threads disposed around the outside periphery of a portion of the end having said pressurized fluid inlet opening therein and a plurality of flat surfaces formed around the outside periphery of a portion of the closed opposite end thereof for facilitating threadedly connecting the support member into a complementary threaded fitting;

a rupture disk sealingly attached to said support member over the end thereof having said pressurized fluid inlet opening therein whereby until rupture of said rupture disk, pressurized fluid is prevented from flowing from said fluid inlet opening of said support member to said discharge port thereof; and a resilient closure member ring positioned on and around the external sides of said support member with a portion thereof sealingly positioned over said pressurized fluid discharge port thereof, said resilient closure member ring being of a size such that its resiliency biases it towards the sides and the pressurized fluid discharge port of said support member so that upon rupture of said rupture disk and the release of pressurized fluid through said support member to said discharge port, the force of the pressurized fluid exerted on said closure member overcomes the bias of and moves said closure member away from said discharge port whereby said pressurized fluid flows therethrough, but upon termination of the flow of pressurized fluid through said discharge port said closure member moves back into a sealing position over said discharge port.

2. The rupture disk assembly of claim 1 wherein said support member includes a plurality of spaced apart pressurized fluid discharge ports with portions of said resilient closure member positioned over each said discharge ports.

3. The rupture disk assembly of claim 2 which is further characterized to include a continuous groove for containing said resilient closure member formed in the external sides of said support member and intersecting said discharge ports.

4. The rupture disk assembly of claim 3 wherein said rupture disk includes a concave-convex portion having at least one score on a surface thereof forming a line of weakness therein.

* * * * *